(12) United States Patent  (10) Patent No.: US 8,147,282 B2
Levander  (45) Date of Patent: Apr. 3, 2012

(54) MARINE VESSEL POWER GENERATION SYSTEM

(75) Inventor: Oskar Levander, Turku (FI)

(73) Assignee: WärtsiläFinland Oy, Vaasa (FI)

( * ) Notice: Subject to any disclaimer, the term of this patent is extended or adjusted under 35 U.S.C. 154(b) by 166 days.

(21) Appl. No.: 12/307,534

(22) PCT Filed: Jun. 1, 2007

(86) PCT No.: PCT/FI2007/050320
§ 371 (c)(1),
(2), (4) Date: Jan. 5, 2009

(87) PCT Pub. No.: WO2008/003823
PCT Pub. Date: Jan. 10, 2008

(65) Prior Publication Data
US 2009/0311923 A1 Dec. 17, 2009

(30) Foreign Application Priority Data
Jul. 6, 2006 (FI) ................................. 20065481

(51) Int. Cl.
B63H 21/20 (2006.01)

(52) U.S. Cl. ............................................. 440/3; 440/4

(58) Field of Classification Search .................. 440/3, 4; 60/645, 698, 716, 718; 205/628; 307/9.1; 429/17
See application file for complete search history.

(56) References Cited

U.S. PATENT DOCUMENTS

| 3,826,218 | A | * | 7/1974 | Hiersig et al. | 440/1 |
| 5,512,145 | A | * | 4/1996 | Hollenberg | 205/628 |
| 5,632,870 | A | * | 5/1997 | Kucherov | 204/241 |
| 6,610,193 | B2 | * | 8/2003 | Schmitman | 205/628 |
| 6,846,208 | B1 | * | 1/2005 | Goldmeer et al. | 440/3 |
| 6,978,617 | B2 | * | 12/2005 | Goldmeer et al. | 60/698 |
| 7,128,624 | B1 | * | 10/2006 | Goldmeer et al. | 440/38 |

FOREIGN PATENT DOCUMENTS

| EP | 1531125 | A | 5/2005 |
| GB | 2400611 | A | 10/2004 |
| GB | 2405742 | A | 3/2005 |

* cited by examiner

Primary Examiner — Lars A Olson
(74) Attorney, Agent, or Firm — Chernoff, Vilhauer, McClung & Stenzel

(57) ABSTRACT

A marine vessel power generation system comprising a conventional machinery arrangement, such as an internal combustion engine (2) and a generator (3), a propulsion system, and a main switchboard (6). In order to provide an environmental friendly power generation system, when the marine vessel enters, leaves or is in port, said system is provided with an $H_2O$ operated power generation arrangement (8) for generating $H_2O$ from seawater in order to produce electrical energy.

9 Claims, 4 Drawing Sheets

MARINE VESSEL POWER GENERATION SYSTEM

This is a national stage application filed under 35 USC 371 based on International Application No. PCT/FI2007/050320 filed Jun. 1, 2007, and claims priority under 35 USC 119 of Finnish Patent Application No. 20065481 filed Jul. 6, 2006.

TECHNICAL FIELD

The present invention relates to a marine vessel power generation system comprising a conventional machinery arrangement, such as an internal combustion engine and a generator, a propulsion system, and a switchboard. The present invention also relates to a method for power generation on a marine vessel.

BACKGROUND ART

Marine vessels are usually provided with means for production of auxiliary energy, i.e. for additional propulsion purposes, as well as for the use of hotel consumers, etc. Conventionally auxiliary energy is produced by means of e.g. smaller diesel engines, i.e. auxiliary generator sets connected to the switchboard of the power generation system. Such engines are usually not of very high efficiency and they also generate considerable emissions.

SUMMARY OF THE INVENTION

An object of the present invention is to avoid the drawbacks of known solutions and to provide an environmental friendly marine vessel power generation system.

The basic idea of the invention is to provide a two mode power generation system suitable for power generation at sea on one hand and for power generation in port, or close to port, on the other hand. For this purpose the power generation system further comprises an $H_2$ operated power generation arrangement for generating $H_2$ from seawater in order to produce electrical energy.

The $H_2$ power generation arrangement advantageously includes an $H_2$ electrolysis device, an $H_2$ storage and an $H_2$ operated power generation apparatus.

At sea (first mode) the conventional machinery arrangement of the marine vessel, in addition to propulsion, is used to provide electrical energy for e.g. hotel consumers and for the $H_2$ electrolysis device for producing $H_2$ to be supplied to the $H_2$ storage for future use. The power generation at sea may thus be carried out by low cost fuels such as heavy fuel oil.

In port, or close to port, (second mode), all power generation for propulsion as well as electrical energy for hotel consumers, is carried out by the $H_2$ operated power generation arrangement, whereby the $H_2$ stored in the $H_2$ storage is supplied to the $H_2$ operated power generation apparatus for producing the required electrical energy. Consequently, there are no emissions in port, where the environmental impact is greater than at sea. The energy used in port is thus generated at sea with low cost fuels.

The $H_2$ operated power generation apparatus provides electrical energy for an electrical propulsion arrangement or a combined mechanical and electrical propulsion unit of the propulsion system as well as for e.g. hotel consumers by way of the switchboard. The $H_2$ operated power generation apparatus may thus independently and separately from the conventional machinery arrangement provide for the electrical energy consumption on the marine vessel when desired, particularly in port or close to port in order to avoid any emissions in an environmentally sensitive area. Furthermore, such an $H_2$ operated power generation apparatus generally has better efficiency than small diesel engines conventionally used for auxiliary energy production. This also means that there is no need to use low sulphur high cost fuels in port. Lower emissions also have economical benefits due to reduction of related fees.

BRIEF DESCRIPTION OF DRAWINGS

In the following the present invention is described in more detail, by way of example only, with reference to the attached schematic drawings, in which.

DETAILED DESCRIPTION

Figure 1:
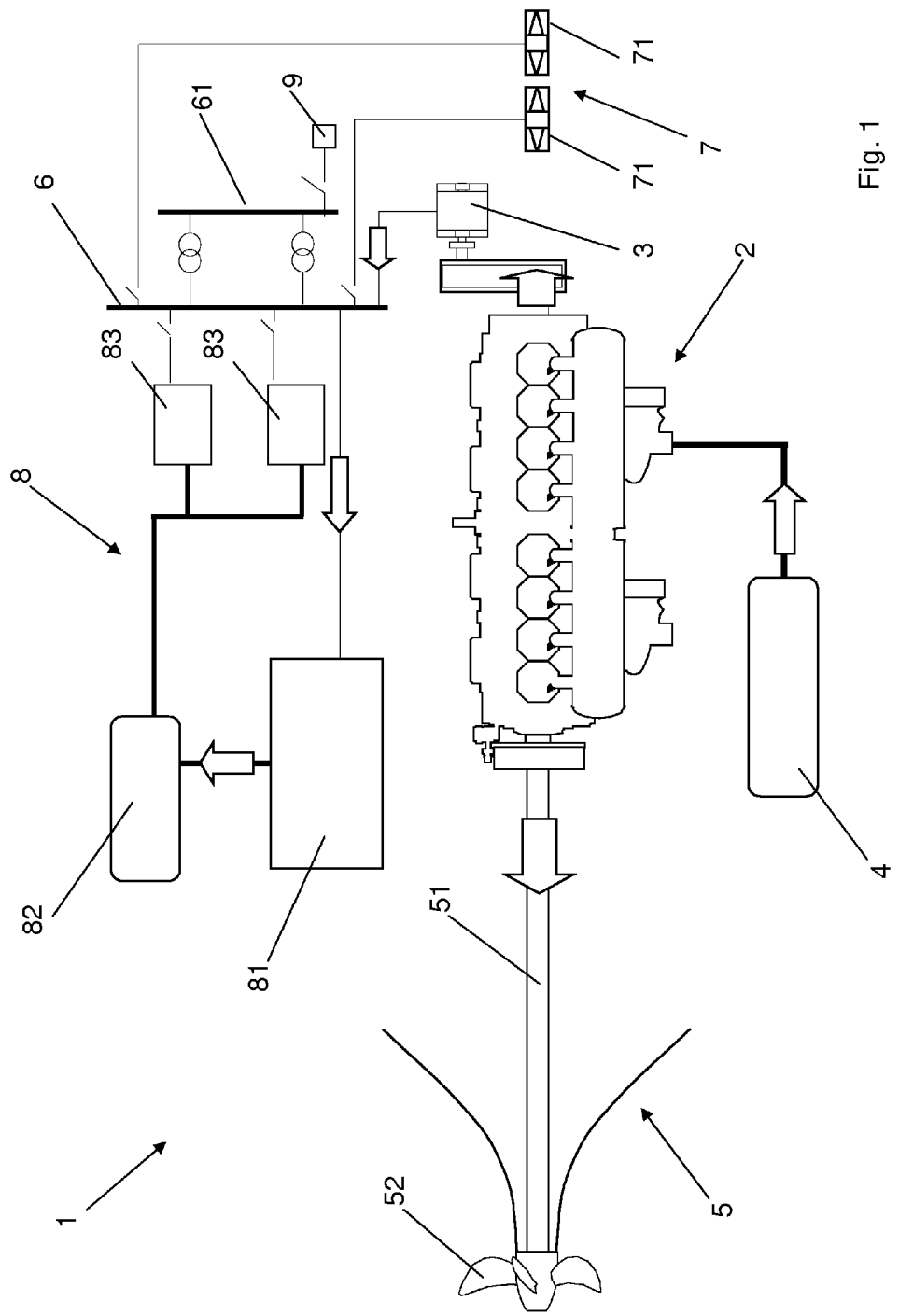
FIG. 1 shows an embodiment of a power generation system according to the invention in a first mode.
Figure 2:
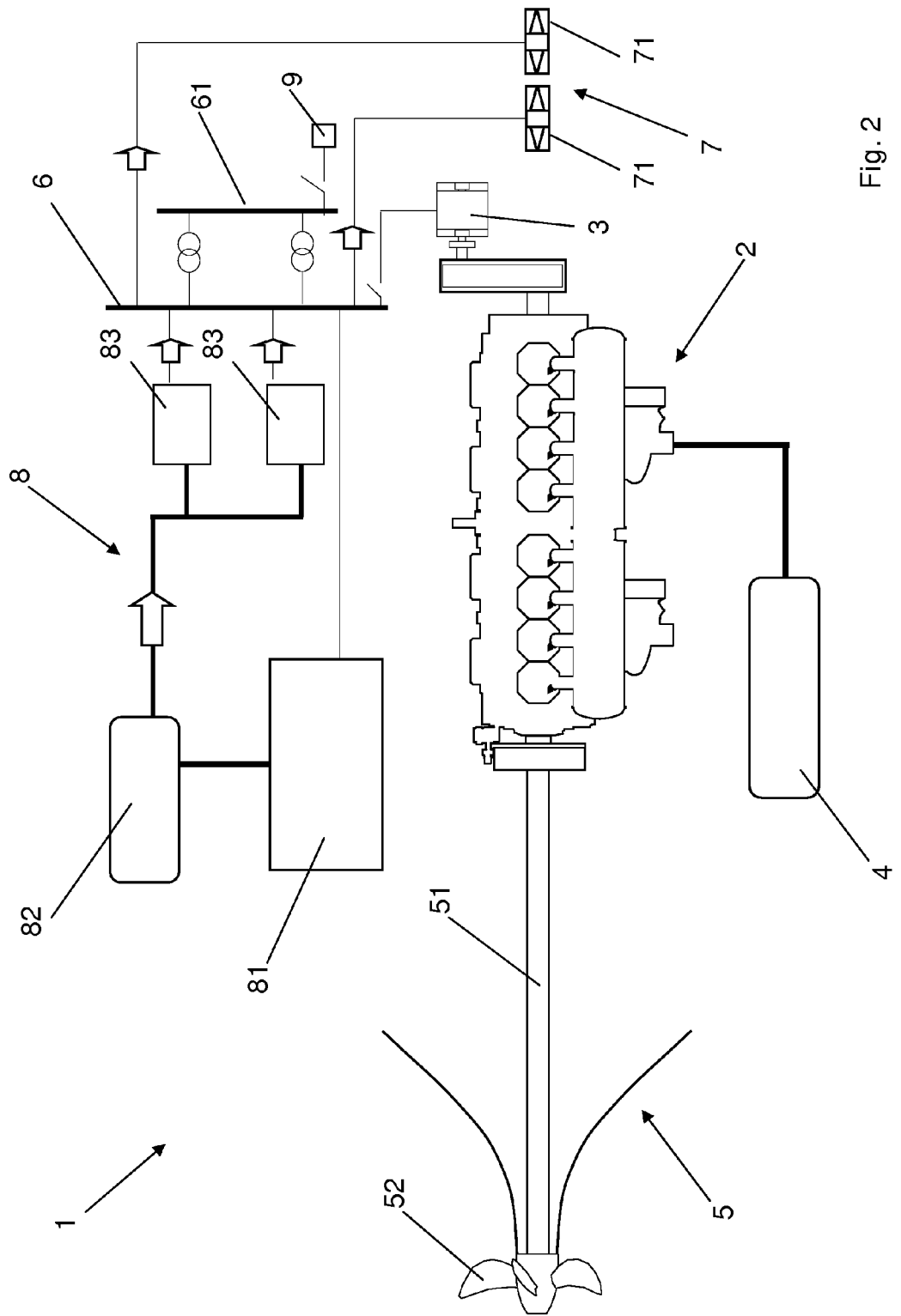
FIG. 2 shows the embodiment of FIG. 1 a second mode.

In FIG. 1 and FIG. 2 a marine vessel power generation system is generally indicated with reference numeral 1. The power generation system comprises a conventional machinery arrangement, such as an internal combustion engine 2 and a generator 3, in this embodiment a shaft generator 3 connected to the free end of the internal combustion engine 2. Further, the arrangement includes a heavy fuel oil (HFO) storage 4 for supplying fuel to the internal combustion engine 2. The internal combustion engine 2 drives a propulsion system, in this embodiment a mechanical propulsion unit 5 including a main shaft 51 and a propeller 52 directly connected to the internal combustion engine 2. The internal combustion engine 2 also drives the generator 3, which delivers electrical energy to a switchboard 6.

The switchboard 6 is shown to be connected to an auxiliary switchboard 61 for delivering electrical energy for the use of e.g. hotel consumers 9. Electrical energy for such hotel consumers may be provided directly from the switchboard 6 as well. The propulsion system further includes an electrical propulsion arrangement 7. The electrical propulsion arrangement 7 may include two separate electrical propulsion units 71, which may be bow thrusters, stern thrusters or electric pods. The electrical propulsion arrangement 7 is connected to the switchboard 6 for receiving electrical energy from the switchboard 6.

Such a set-up is more or less conventional. Most often one or more auxiliary generator sets (not shown), including internal combustion engines, are connected to the switchboard for providing additional electrical energy thereto.

In the present invention, however, the power generation system further comprises an $H_2$ operated power generation arrangement 8, including an $H_2$ electrolysis device 81 for production of $H_2$ from sea water, an $H_2$ storage 82 comprising special gas storage tanks, and, in this embodiment, two $H_2$ operated power generation apparatus. A double apparatus is advantageous e.g. in view of redundance.

The $H_2$ operated power generation apparatus may be an internal combustion engine, e.g. a gas driven engine or a gas turbine, or a fuel cell.

The $H_2$ electrolysis device 81 is powered by electrical energy generated by the generator 3 and delivered from the switchboard 6. The $H_2$ electrolysis device generates $H_2$ from seawater when the marine vessel is out at sea and supplies $H_2$ to the $H_2$ storage 82 for subsequent use as described below.

When the marine vessel enters, leaves or lies in port, the stored $H_2$ is supplied to the $H_2$ operated power generation apparatus 83 for providing electrical energy to the switchboard 6 and further to the electrical propulsion arrangement 7 and, in this embodiment, to the auxiliary switchboard 61 for the use of e.g. hotel consumers 9. Electrical energy for hotel consumers may be provided directly from the switchboard 6 as well.

The basic idea of the present invention will shortly be described in the following.

FIG. 1 represents a first mode of operation of the power generation system 1 when the marine vessel is at sea.

In this first mode, out at sea, the marine vessel is operated by the conventional machinery arrangement, whereby the internal combustion engine 2 drives the mechanical propulsion unit 5. The internal combustion engine 2 is fuelled by heavy HFO from the HFO storage 4. In addition the internal combustion engine 2 drives the generator 3 for producing electrical energy, which is delivered to the switchboard 6, on the one hand for use on the marine vessel for auxiliary purposes as described above, and on the other hand for powering the $H_2$ electrolysis device 81 which produces $H_2$ by electrolysis of sea water. The $H_2$ thus produced is then stored in the $H_2$ storage for subsequent use.

This means that the extra emissions from burning of HFO are generated at sea, far away from any shorelines, whereby e.g. sulphur oxides only have their local impact far from more sensitive areas.

The block arrows indicate the flow of energy in this first mode.

FIG. 2 represents a second mode of operation of the power generation system 1 when the marine vessel enters, leaves or is in port.

In this second mode, when the marine vessel has been out at sea and enters port, the conventional machinery arrangement may be shut down. The marine vessel may then idle into port, whereby the propulsion power is provided by the electrical propulsion arrangement 7. For this purpose, $H_2$ from the $H_2$ storage 82 is supplied to the $H_2$ operated power generation apparatus 83, which generate electrical energy and deliver it to the electrical propulsion arrangement 7 by way of the switchboard 6. The $H_2$ operated power generation apparatus 83 may also be used to provide any other auxiliary energy needed e.g. by hotel consumers 9 by way of the switchboard 6, or as indicated in this embodiment, by way of the auxiliary switchboard 61.

This means that there are no emissions in port, where the environmental impact is greater than at sea. The energy for the marine vessel power generation in port has thus been produced out at sea.

The block arrows indicate the flow of energy in this second mode.

Figure 3:
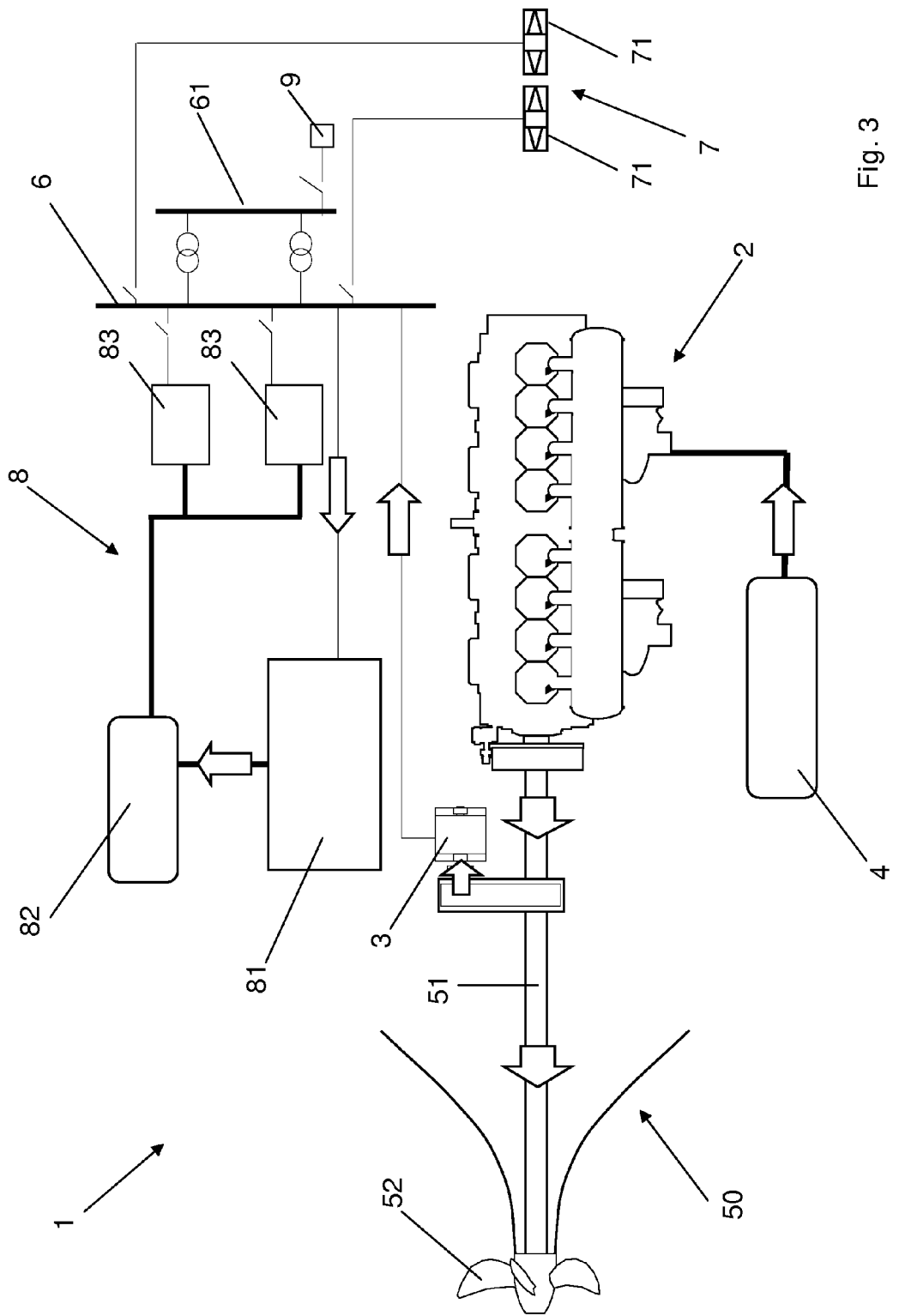
FIG. 3 shows another embodiment of a power generation system according to the invention in a first mode.

FIG. 3 shows another embodiment of a power generation system according to the invention in the first mode of operation, when the marine vessel is out at sea. This embodiment corresponds to the embodiment of FIG. 1, except that instead of a mechanical propulsion unit a combined mechanical and electrical propulsion unit 50 is deployed. The combined mechanical and electrical propulsion unit 50 has the generator 3 on the main shaft 51, between the internal combustion engine 2 and the propeller 52.

In this first mode, out at sea, the marine vessel is operated by the conventional machinery arrangement, whereby the internal combustion engine 2 drives the combined mechanical and electrical propulsion unit 50. The internal combustion engine 2 is fuelled by heavy HFO from the HFO storage 4. In addition the internal combustion engine 2 drives the generator 3 for producing electrical energy, which is delivered to the switchboard 6, on the one hand for use on the marine vessel for auxiliary purposes as described above, and on the other hand for powering the $H_2$ electrolysis device 81 which produces $H_2$ by electrolysis of sea water. The $H_2$ thus produced is then stored in the $H_2$ storage for subsequent use.

This means that the extra emissions from burning of HFO are generated at sea, far away from any shorelines, whereby e.g. sulphur oxides only have their local impact far from more sensitive areas.

The block arrows indicate the flow of energy in this first mode.

Figure 4:
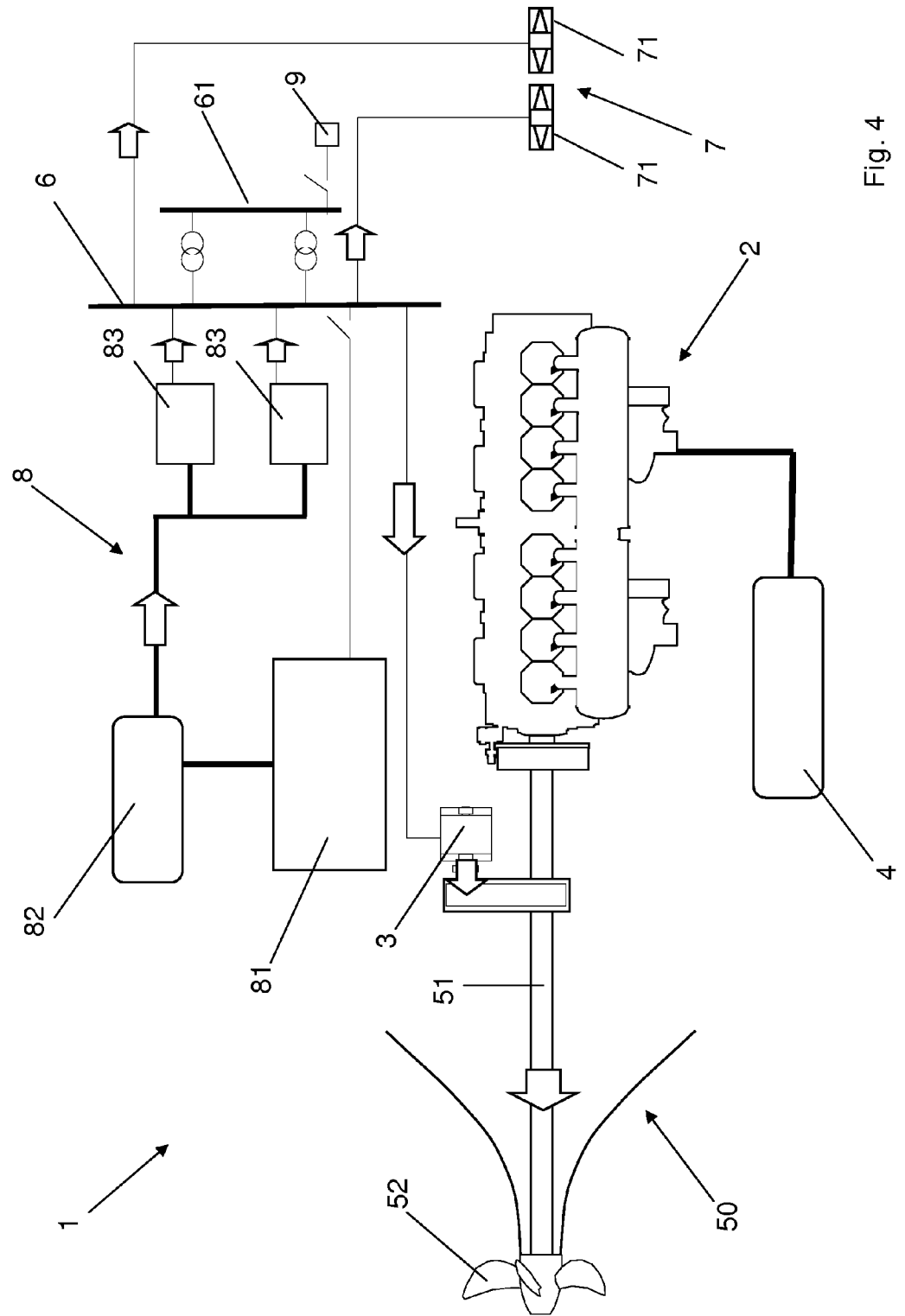
FIG. 4 shows the embodiment of FIG. 3 in a second mode.

FIG. 4 shows the embodiment of FIG. 3 in the second mode of operation, when the marine vessel enters, leaves or is in port. In this context, the electrical energy generated by the $H_2$ operated power generation apparatus 83, is supplied back to the generator 3, which then drives the combined mechanical and electrical propulsion unit 50. This arrangement as well provides for emission free power generation.

In this second mode, when the marine vessel has been out at sea and enters port, the conventional machinery arrangement may be shut down. The marine vessel may then idle into port, whereby the propulsion power is provided by the combined mechanical and electrical propulsion unit 50, i.e. by using the electrical drive. The marine vessel may of course also be provided with an electrical propulsion arrangement 7 (as illustrated in FIG. 4), whereby the propulsion power may be provided by the electrical propulsion arrangement 7. For this purpose, $H_2$ from the $H_2$ storage 82 is supplied to the $H_2$ operated power generation apparatus 83, which generate electrical energy and deliver it to the combined mechanical and electrical propulsion unit 50 and/or the electrical propulsion arrangement 7 by way of the switchboard 6. The $H_2$ operated power generation apparatus 83 may also be used to provide any other auxiliary energy needed e.g. by hotel consumers 9 by way of the switchboard 6, or as indicated in this embodiment, by way of the auxiliary switchboard 61.

This means that there are no emissions in port, where the environmental impact is greater than at sea. The energy for the marine vessel power generation in port has thus been produced out at sea.

The block arrows indicate the flow of energy in this second mode.

The present invention thus provides for two separate modes of power generation, the first mode for use out at sea and the second mode for use in port.

Although not shown in FIGS. 1 to 4, nor discussed above, the marine vessel may in addition be provided with auxiliary generator sets deployed in parallel with the $H_2$ operated power generation arrangement.

The drawings and the description related thereto are only intended for clarification of the basic idea of the invention. The invention may vary in detail, e.g. the number and type of different components, such as the propulsion units, generators, $H_2$ storage, etc., may be varied according to need within the scope of the ensuing claims.

The invention claimed is:

1. A method of operating a marine vessel that comprises an internal combustion engine, a fuel oil storage device for supplying fuel oil to the internal combustion engine, a generator, an electrolysis device, an $H_2$ storage device, and an $H_2$ operated power generation apparatus, said method comprising:

when the marine vessel is at sea, fueling the internal combustion engine with fuel oil from the fuel oil storage device, using the internal combustion engine to drive both a mechanical propulsion system and the generator, supplying electrical energy produced by the generator to the electrolysis device by way of a switchboard for producing $H_2$ from seawater, and supplying $H_2$ produced by electrolysis device to the $H_2$ storage device, when the marine vessel enters, leaves or is in port, supplying $H_2$ from the $H_2$ storage device to the $H_2$ operated power generation apparatus for producing electrical energy, and supplying electrical energy produced by the $H_2$ operated power generation apparatus by way of the switchboard to an electrical propulsion system.

2. A method according to claim 1, wherein the mechanical propulsion system comprises a shaft driven propeller and the generator is a shaft driven generator.

3. A method according to claim 1, wherein the $H_2$ operated power generation apparatus comprises an internal combustion engine or a fuel cell.

4. A method according to claim 1, comprising supplying electrical energy produced by the $H_2$ operated power generation apparatus to the generator by way of the switchboard when the marine vessel enters, leaves or is in port and operating the generator to drive the mechanical propulsion system.

5. A method according to claim 1, comprising supplying electrical energy produced by the $H_2$ operated power generation apparatus when the vessel enters, leaves or is in port to hotel consumers by way of the switchboard.

6. A marine vessel power generation system comprising an internal combustion engine, a fuel oil storage device for supplying fuel oil to the internal combustion engine, a generator, an electrolysis device, an $H_2$ storage device, an $H_2$ operated power generation apparatus, a mechanical propulsion system and an electrical propulsion system, power generation system having a first operating configuration in which the internal combustion engine is fuelled with fuel oil from the fuel oil storage device and is connected to drive both the mechanical propulsion system and the generator, the generator is connected to supply electrical energy produced by the generator to the electrolysis device by way of a switchboard for producing $H_2$ from seawater, and the electrolysis device is connected to supply $H_2$ produced by the electrolysis device to the $H_2$ storage device, and a second operating configuration in which the $H_2$ storage device is connected to supply $H_2$ to the $H_2$ operated power generation apparatus for producing electrical energy, and the $H_2$ operated power generation apparatus is connected to supply electrical energy by way of the switchboard to the electrical propulsion system.

7. A marine vessel according to claim 6, wherein the $H_2$ operated power generation apparatus comprises an internal combustion engine or a fuel cell.

8. A marine vessel according to claim 6, wherein in the second operating configuration the $H_2$ operated power generation apparatus is connected to supply electrical energy to the generator by way of the switchboard and the generator is operative to drive the propulsion system.

9. A marine vessel according to claim 6, wherein in the second operating configuration the $H_2$ operated power generation apparatus is connected to supply electrical energy to hotel consumers by way of the switchboard.

* * * * *